No. 669,444. Patented Mar. 5, 1901.
P. KLITSCH.
BELT PULLEY.
(Application filed Oct. 25, 1900.)
(No Model.)
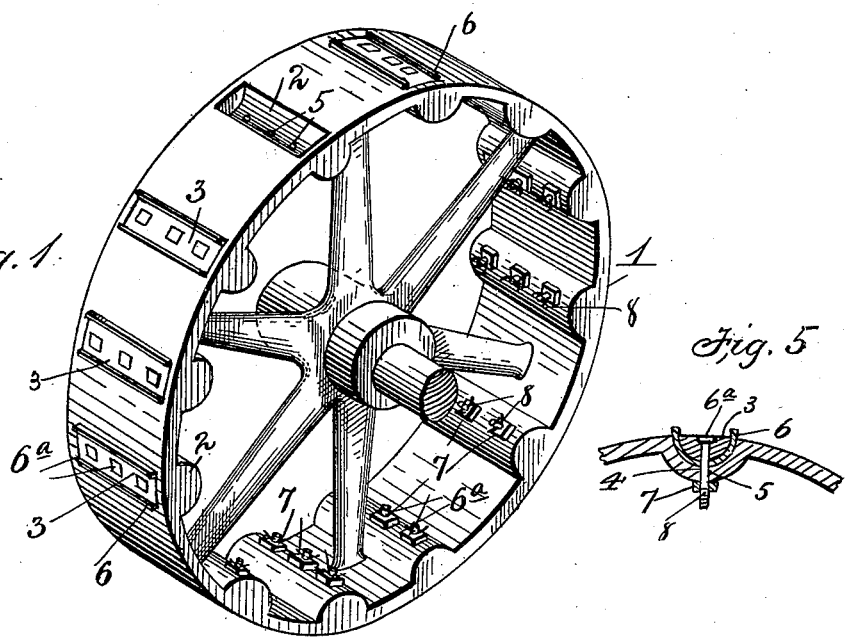
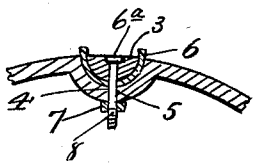
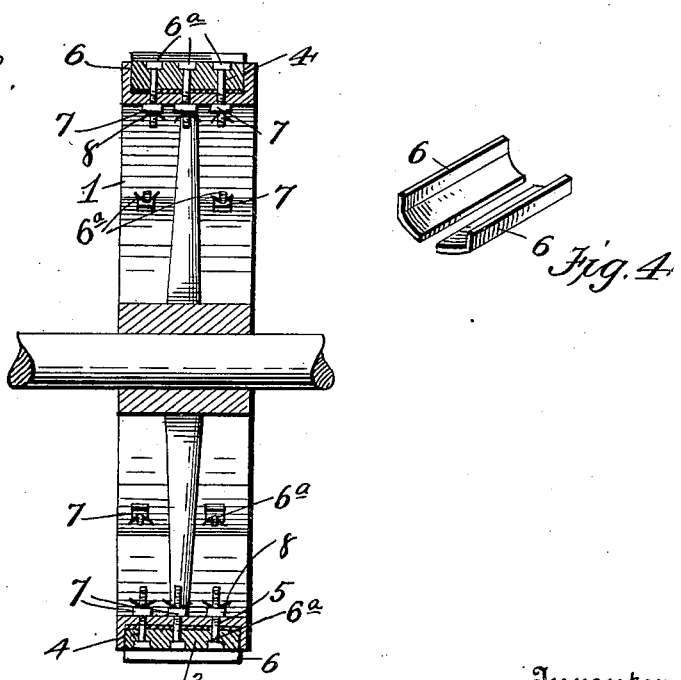
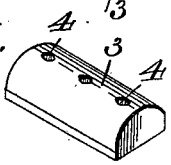
Witnesses: Inventor:
Peter Klitsch,
Attorneys.

UNITED STATES PATENT OFFICE.

PETER KLITSCH, OF MAHANOY CITY, PENNSYLVANIA.

BELT-PULLEY.

SPECIFICATION forming part of Letters Patent No. 669,444, dated March 5, 1901.

Application filed October 25, 1900. Serial No. 34,352. (No model.)

*To all whom it may concern:*

Be it known that I, PETER KLITSCH, a citizen of the United States, residing at Mahanoy City, in the county of Schuylkill and State of Pennsylvania, have invented new and useful Improvements in Belt-Pulleys, of which the following is a specification.

My invention relates to means for giving a frictional face to belt-pulleys; and the object of the same is to provide a simple, reliable, and inexpensive belt-pulley having clamped at intervals on its face short sections of frictional material, like rubber, leather, canvas, or like material, to prevent the belt from slipping. I attain this object by means of the construction shown in the accompanying drawings, in which—

Figure 1 is a perspective view of a belt-pulley made in accordance with my invention. Fig. 2 is a sectional view thereof. Fig. 3 is a detail perspective of one of the clamps. Fig. 4 is a similar view of a slitted strip of flexible material made use of in my invention. Fig. 5 is a detail section of one of the recesses and clamp-block with wheel shown in fragment.

Like numerals of reference designate like parts wherever they occur in the different views.

The numeral 1 designates a belt-pulley having a series of recesses 2 formed in the face of the rim thereof. Any suitable number of these recesses may be used.

The numeral 3 designates a clamp-block made to conform in shape and fit the recesses 2. These clamp-blocks are convex in their under faces and plane on their outer surfaces, so that when in place they form practically continuations of the pulley-rim. The clamps are provided with any suitable number of bolt-holes 4, and the recesses 2 are also provided at 5 with registering holes.

The numeral 6 designates pieces or strips or sheets of rubber, leather, pieces of belting, or pieces of canvas clamped in the recesses in the rim of the pulley by the blocks 3. These strips or pieces of frictional material are of a length to extend when clamped somewhat beyond the surface of the rim, so that the belt will not slip on the pulley. The bolts 6ª pass through the clamp-blocks, the strips, and the rim, and these bolts may be held in place by the nuts 7. Pins 8 may be passed through the bolts for holding the nuts in place. When the strips have become worn in use, they may be each cut in two, and the short pieces thus formed may be extended beyond the periphery of the pulley the desired distance and again clamped in place.

From the foregoing it will be obvious that the pulley is simple in construction, capable of considerable adjustment as to the extension of the strips, and in use will be found practical and efficient for its purpose.

Having thus fully described my invention, what I claim is—

1. The combination, substantially as described, with a pulley having concave recesses in its rim, strips of flexible material fitted in said recesses with their edges projecting beyond the face of the pulley, and blocks convex on the under side seated in said recesses and firmly secured to clamp said strips.

2. The combination, substantially as described, with a pulley having recesses in its rim, of strips or sheets of flexible material fitting said recesses with their edges projecting beyond the face of said pulley, and blocks seated in said recesses on top of said sheets of flexible material, with their faces flush with the face of the pulley.

In testimony whereof I have hereunto set my hand in presence of two subscribing witnesses.

PETER KLITSCH.

Witnesses:
BENNETT S. JONES,
GUY E. PADGETT.